US011323470B2

(12) United States Patent
Hecht (10) Patent No.: US 11,323,470 B2
(45) Date of Patent: May 3, 2022

(54) ANALYZING AND ADDRESSING LEAST-PRIVILEGE SECURITY THREATS ON A COMPOSITE BASIS

(71) Applicant: CyberArk Software Ltd., Petach-Tikva (IL)

(72) Inventor: Asaf Hecht, Petach-Tikva (IL)

(73) Assignee: CyberArk Software Ltd., Petach-Tikva (IL)

( * ) Notice: Subject to any disclaimer, the term of this patent is extended or adjusted under 35 U.S.C. 154(b) by 23 days.

(21) Appl. No.: 16/719,464

(22) Filed: Dec. 18, 2019

(65) Prior Publication Data
US 2021/0194911 A1    Jun. 24, 2021

(51) Int. Cl.
*H04L 29/06*    (2006.01)

(52) U.S. Cl.
CPC ........ *H04L 63/1433* (2013.01); *H04L 63/102* (2013.01); *H04L 63/20* (2013.01)

(58) Field of Classification Search
CPC ... H04L 63/1433; H04L 63/102; H04L 63/20; H04L 63/14; H04L 63/145; H04L 63/1466; H04L 63/1483
See application file for complete search history.

(56) References Cited

U.S. PATENT DOCUMENTS

| | | | | |
|---|---|---|---|---|
| 8,554,912 | B1 * | 10/2013 | Reeves | G06F 21/552 709/225 |
| 2013/0159049 | A1 * | 6/2013 | Arumugam | G06Q 10/063 705/7.28 |
| 2015/0220929 | A1 * | 8/2015 | Monk | G06Q 20/4016 705/13 |
| 2016/0171415 | A1 * | 6/2016 | Yampolskiy | G06F 21/577 705/7.28 |
| 2017/0251276 | A1 * | 8/2017 | David | H04N 21/25816 |
| 2019/0081949 | A1 * | 3/2019 | Wu | G06F 40/40 |
| 2019/0089725 | A1 * | 3/2019 | Anachi | H04L 63/1433 |
| 2019/0327271 | A1 * | 10/2019 | Saxena | G06N 20/00 |
| 2021/0142209 | A1 * | 5/2021 | Patil | G06N 20/00 |

OTHER PUBLICATIONS

Hecht, Asaf, CyberArk Impact 2020; "The Cloud Shadow Admin Threat: 10 Permissions to Protect", pp. 1-19, https://www.cyberarkcom/threat-research-blog/cloud-shadow-admin-threat-10-permissions-protect/.

* cited by examiner

*Primary Examiner* — Farid Homayounmehr
*Assistant Examiner* — Suman Debnath
(74) *Attorney, Agent, or Firm* — Finnegan, Henderson, Farabow, Garrett & Dunner LLP (57) ABSTRACT

Disclosed embodiments relate to systems and methods for analyzing and addressing least-privilege security threats on a composite basis. Techniques include identifying a permission associated with a secured resource, identifying attributes associated with the permission, weighting the attributes, and, based on the attributes and their weights, creating a normalized score corresponding to the risk presented by the permission. Further techniques include identifying attributes associated with the secured resource, identifying special risk factors, and creating weighted scores based on the resource attributes and special risk factors. Other techniques include aggregating the weighted scores and using the weighted scores to identify insecure areas within the system.

22 Claims, 5 Drawing Sheets

ANALYZING AND ADDRESSING LEAST-PRIVILEGE SECURITY THREATS ON A COMPOSITE BASIS

BACKGROUND

Today's computing systems and networks use a wide variety of permissions to grant users access to restricted resources. While they are an important part of many modern computing environments, permissions that are not properly managed can present significant security risks. Each additional privilege (or privilege level, or duration of privileges) presents another channel through which an attacker may gain unauthorized access to target a system, computer, application, or other resource. Ideally, a system would provide only those permissions that are necessary for it to function properly, and no more, because unused permissions unnecessarily increase the risk and severity of attacks.

The high number and large variety of types of permissions pose a unique challenge to addressing these risks. Not all unused permissions present the same level of risk for attacks. For example, some permissions may give users a greater scope of access, or access to more sensitive resources, thus increasing the potential damage that could be achieved by a malicious attacker. These problems are compounded in modern virtualized (e.g., cloud-based) computing environments. In such environments, a variety of different types of applications may be utilized, each having its own rules or policies for using privileges. Similar problems exist in modern on-premises networks, IoT networks, and other types of complex networks.

Accordingly, solutions are needed to identify unused permissions and assess their damage potential so that unused permissions may be addressed in an efficient and effective manner. It would be advantageous for such solutions to assess the damage potential using a normalized score to permit meaningful comparisons between different types of permissions. Solutions should also permit such scores to be calculated for individual permissions, groups of permissions associated with an entity, or groups of entities present within a specific environment. Score comparisons should enable the system to prioritize between permissions, entities, or environments and to identify the highest risk factors so they may be addressed on a prioritized basis.

SUMMARY

The disclosed embodiments describe non-transitory computer readable media, systems, and methods for analyzing and addressing least-privilege security threats on a composite basis. For example, in an exemplary embodiment, there may be a non-transitory computer readable medium including instructions that, when executed by at least one processor, cause the at least one processor to perform operations for developing composite and permission-based risk assessments for network identities. The operations may comprise accessing a permission associated with a network identity; for the permission, identifying a usage status of the permission; performing a composite risk assessment for the permission, the composite risk assessment including at least two of: identifying a permission type associated with the permission, identifying a sensitivity of a target resource associated with the permission, or identifying a customized risk factor associated with the permission, the customized risk factor being developed for the network environment; developing a result of the composite risk assessment for the permission; and performing a security response based on the result of the composite risk assessment, the security response including at least one of: classifying the permission associated with the network identity, identifying the network identity as a candidate for a privilege reduction operation, comparing the network identity with a second network identity for which a second composite risk assessment was performed, or generating an output identifying the result of the composite risk assessment and the network identity.

According to a disclosed embodiment, the operations may further comprise performing the composite risk assessment for each permission within the set for which the permission is determined to have a usage status below a threshold of use.

According to a disclosed embodiment, the result of the composite risk assessment may be a composite result based on the composite risk assessment for each permission within the set for which the permission is determined to have a usage status below the threshold of use.

According to a disclosed embodiment, the operations may further comprise performing the composite risk assessment for a plurality of network identities in the network environment and developing an environment-wide result of the composite risk assessment for the plurality of network identities in the network environment.

According to a disclosed embodiment, determining the usage status of the permission may include determining whether the permission has been used within a threshold amount of time.

According to a disclosed embodiment, the customized risk factor associated with the permission may address whether the permission corresponds to a designated sensitive administrator privilege.

According to a disclosed embodiment, the customized risk factor associated with the permission may address whether the permission corresponds to a designated sensitive target network resource.

According to a disclosed embodiment, the customized risk factor associated with the permission may address whether the permission corresponds to a historical attack permission.

According to a disclosed embodiment, the customized risk factor associated with the permission may address a security status of the network identity.

According to another disclosed embodiment, a method may be implemented for developing composite and permission-based risk assessments for network identities. The method may comprise accessing a permission associated with a network identity; for the permission, identifying a usage status of the permission; performing a composite risk assessment for the permission, the composite risk assessment including at least two of: identifying a permission type associated with the permission, identifying a sensitivity of a target resource associated with the permission, or identifying a customized risk factor associated with the permission, the customized risk factor being developed for the network environment; developing a result of the composite risk assessment for the permission; and performing a security response based on the result of the composite risk assessment, the security response including at least one of: classifying the permission associated with the network identity, identifying the network identity as a candidate for a privilege reduction operation, comparing the network identity with a second network identity for which a second composite risk assessment was performed, or generating an output identifying the result of the composite risk assessment and the network identity.

According to a disclosed embodiment, each of the factors in the composite risk assessment may be assigned one or more weights.

According to a disclosed embodiment, developing the result of the composite risk assessment for the permission may include generating a risk-based least-privilege score for the permission.

According to a disclosed embodiment, the method may further comprise applying one or more weights to the risk-based least-privilege score for the permission.

According to a disclosed embodiment, the permission type of the permission may include at least one of: a read permission, a write permission, a delete permission, or a create permission.

According to a disclosed embodiment, the permission type of the permission may be based on a frequency of usage of the permission by the network identity.

According to a disclosed embodiment, the permission type of the permission may be based on a frequency of usage of the permission by a plurality of network identities in the network environment.

According to a disclosed embodiment, the sensitivity of the target resource associated with the permission may be based on a predefined classification of sensitivity.

According to a disclosed embodiment, the sensitivity of the target resource associated with the permission may be based on a sensitivity score determined for the target resource.

According to a disclosed embodiment, the sensitivity of the target resource associated with the permission may be based on a size of the target resource.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

In accordance with disclosed techniques, a system may have multiple users, applications, or other types of identities attempting to access a secure resource, such as a cloud computing resource. As discussed further below, an identity may be a user account, machine account, application account, virtual computing resource instance, serverless code instance, or any other type of account that may be associated with a particular user, machine, or application in a computer network. An identity may also be used to gain access to resources of a local machine or computing device, such as a locally installed application or remote desktop. An identity may access the resource using a client computing device, virtual computing instance, or other type of computing resource. In order to grant access to the identity, the resource or another part of the computing system may require authorization and/or authentication of the identity.

Such identities may have different levels of access rights associated with them, ranging from broad access rights (e.g., administrator or root-level privileges) across several platforms to very narrow access rights (e.g., network guest, or temporary accounts). Many identities with broad access rights may be labeled as administrator accounts. Such administrator accounts may be listed in an active directory group (e.g., Microsoft Active Directory™, AWS Managed Microsoft AD™, JumpCloud™ directory, or others) to more easily monitor the accounts with the greatest permissions.

However, so-called "shadow admins" may be created through direct assignment of sensitive privileges, either alone or in combination. Shadow admins may present unique threats to systems because they are not included in the admin directory and are thus harder to identify and track. Further, such shadow admins may not be subject to the same security controls as standard administrators with full access. For example, an identity may have a permission allowing it to create an access key for other accounts. A malicious user with access to this identity could then create a new access key for an administrator account, access the administrator account using the newly generated access key, and then carry out attacks using the administrator account's other sensitive permissions. Thus, any identity having the permission to create an access key may, in some circumstances, need to be subject to the same security protocols as full-access administrative accounts.

Modern computing environments often include numerous different identities. Some or all such identities may be dispersed among on-premises and/or virtualized (e.g., cloud-based) network environments. As the number of active permissions in an environment grows, however, this often leads to a greater attack surface for malicious users and thus a greater potential that a malicious user can cause damage to the environment. It can therefore be advantageous to limit the total number of permissions in any given environment. Ideally, the only permissions existing within the environment would be those that are actively used or required, and such permissions would be monitored according to the potential security threat that they pose. A permission that is not used (e.g., unused to its full scope, unused for a period of time, etc.) presents an unnecessary threat that offers no value to the environment.

In the disclosed embodiments, techniques of analyzing and addressing least-privilege security threats on a composite basis are described. In some embodiments, a least-privilege damage score may be calculated that quantifies the threat that an unused permission poses to a secure entity or environment. In other embodiments, scores for individual permissions may be aggregated to calculate a score for the entity. In further embodiments, scores for multiple entities may be aggregated into a single score for a specific environment. In some embodiments, changes to the permissions or environment may be made based upon the one or more scores.

Disclosed embodiments enable an identity (e.g., application, service, user, etc.) to access and execute functions on a remote resource securely, with least-privileges (i.e., a minimal scope of needed privileges, and/or a minimal duration of privileges). Further, disclosed systems are compatible with protocols enabling remote sessions, e.g., RDP, and HTML5 solutions, as well as protocols supporting tunneling to a remote machine, e.g., SSH port forwarding. Over RDP, for example, the system may use clients such as RD-desktop, Terminal Server Client (TS client), VirtualBox Remote Display Protocol (VRDP)™, Free RDP, or any other RDP client. Alternatively, process execution may be facilitated by an application enabling a remote desktop, e.g., Remote Desktop by Google Chrome™, TeamViewer™, LogmeIn™, or Citrix™, as well as other remote access services. For example, if LogmeIn™ is already installed on the target resource, it may be used to connect to the target resource transparently and perform automatic remote process execution.

Further, in other embodiments, the system may enable an identity to access a group of target resources, e.g., to execute code and/or automated processes on the group of target resources, or to perform other actions. For example, the system may invoke automated execution on a plurality of defined target applications or machines. This may be useful in situations where a common task needs to be performed for a group of resources (e.g., a software update, patch installation, data provisioning, etc.). An identity may also be able to enable automated remote process execution on one or a group of target resources. For example, a user may execute automatic upgrades to existing applications on a target resource; retrieve data from the resource; access files, data, or applications residing on the resource; retrieve metrics stored by or associated with the resource; perform one-time or regular maintenance on the resource; perform and/or schedule a job to execute periodically on the resource; retrieve keystrokes and/or window titles associated with a remote session, without requiring administrator privileges on the resource; and perform various other operations.

In some embodiments, the system may identify a prompt from a client computing device associated with an identity requesting access to a target resource. As disclosed below, a computer device may be any of numerous types of devices with data processing and network communications capabilities. Examples include servers, desktop computers, cloud-computing virtual machines or containers, laptops, smart-phones, tablets, personal digital assistants, enterprise digital assistants, smart cards, smart watches, smart bands, smart headphones, computer-embedded clothing, car-computers and other in-vehicle computer equipment, Internet-of-Things (IoT) devices, and any other device with data processing and network connectivity capabilities.

Reference will now be made in detail to the disclosed embodiments, examples of which are illustrated in the accompanying drawings.

Figure 1:
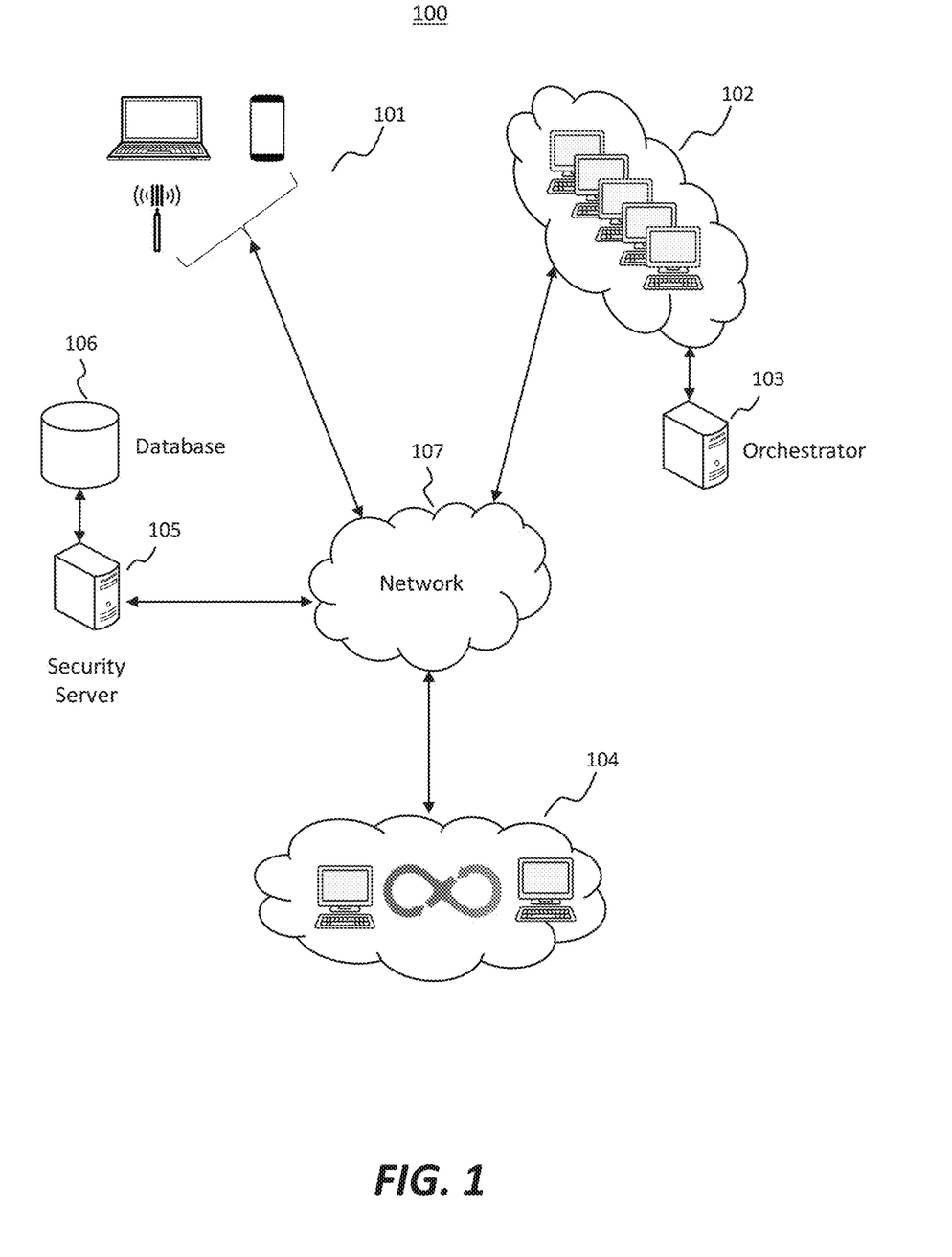
FIG. 1 is a block diagram of an exemplary system for analyzing and addressing least-privilege security threats on a composite basis.

FIG. 1 is a block diagram of an exemplary system for analyzing and addressing least-privilege security threats on a composite basis. System 100 may include client device 101, cloud computing environment 102, cloud orchestrator 103, DevOps environment 104, security server 105, database 106, and network 107 as shown in FIG. 1. Exemplary implementations of these components are discussed below. While FIG. 1 includes particular numbers or arrangements of these components, in various embodiments the number, arrangement, and presence of such components may vary.

Client devices 101 may include a variety of types of devices, including those capable of communication over a network. As illustrated, client devices 101 may be one or more of a personal computer (e.g., a desktop or laptop), an IoT device (e.g., sensor, smart home appliance, printer, connected vehicle, industrial device, etc.), or a handheld device (e.g., a mobile phone, a tablet, notebook, digital camera, etc.). Client device 101 may also be a a vehicle-based or aircraft-based computer, a virtual machine (e.g., virtualized computer, container instance, etc.), a wearable device (e.g., a smart watch, smart jewelry, an implantable device, a fitness tracker, smart clothing, a head-mounted display, etc.), or various other devices capable of processing and/or receiving data. Client devices 101 may also be a server or other network connected computing resource.

In accordance with disclosed embodiments, client devices 101 may be associated with one or more identity. An identity may access, or attempt to access, resources distributed in a computer network and, additionally or alternatively, one or more resources of a local machine or computing device, such as a locally installed application, for example. The identity may also have a number of permissions associated with it that, once authenticated, give the identity access to restricted resources or grant the identity the ability to execute code on the resource, etc.

As described herein, in some embodiments, identities, computer devices, or users may be authenticated before access to and/or control of a target resource is granted or before an identity can cause the target resource to execute code. Authentication may broadly take several forms, such as verification of passwords, SSH keys, asymmetric (e.g., public/private) keys, symmetric keys, Kerberos tickets, Docker signed tags, and other types of cryptographic data or privileged security or access tokens. Further, the authentication may be based on white/black lists for identities or device addresses, or biometric or behavioral information, such as fingerprints, retinal scans, x-rays, biosensors, voice recognition, body movements, walking pace or rhythm, sitting characteristics or patterns, key stroke analysis, and more. In accordance with the disclosed embodiments, the authentication may be single-factor or multi-factor (i.e., a combination of any of the foregoing forms of authentication). Further, as discussed below, the authentication may be performed on the computer device 101, on a remote authentication server (e.g., security server 105), or through a combination of functionality of both.

Cloud computing environment 102 may include one or more virtual machines, which may be based on virtualization tools provided by Amazon Web Services™ (AWS), Microsoft Azure™, IBM Cloud™, Google Cloud Platform™, Cisco Metapod™, Joyent™, vmWare™, or others. Cloud computing environment 102 may include various computing resources, storage resources, security services, developer tools, analytics tools, etc. that may be accessed by client device 101. As an example, AWS™ provides many varying cloud services including searching/analytics (e.g., CloudSearch™), virtual servers (e.g., EC2™), media services (e.g., MediaConvert™) database services (e.g., Aurora™), storage (e.g., S3™), and others. Cloud computing environment 102 may include various entities, machines, or services that include various permissions. Cloud computing environment 102 may be in communication with cloud orchestrator 103. Orchestrator 103 communicates with the different entities or components of cloud computing environment 102 to configure and deploy cloud computing services. In various embodiments, orchestrator 103 may be based on platforms such as AppFormix™, BMC Cloud LifeCycle Management™, IBM Cloud Orchestrator™, AWS CloudFormation™, Kubernetes™, or others.

Client device 101 may communicate with cloud computing environment 102 over a network 107. Such communications may take place across various types of networks, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications technique (e.g., Bluetooth, infrared, etc.), or various other types of network communications. In some embodiments, network 107 may be a cloud network, (e.g., private cloud, public cloud, or hybrid cloud network), or a combination of these types of networks. In some embodiments, the communications may take place across two or more of these forms of networks and protocols.

DevOps environment 104 may also be in communication with other components of system 100 through network 107. DevOps environment 104 may implement a DevOps, continuous development, or continuous deployment process. In some embodiments, DevOps or similar processes may be implemented in DevOps environment 104 to continuously develop or deploy new code to configure, update, or replace services or virtual machines within cloud computing environment 102. DevOps environment 104 may include one or more computers, servers, and storage resources used to implement DevOps processes. In some embodiments, new virtual instances within cloud computing environment 104 may be configured or updated through DevOps environment 104 before they are deployed. In various embodiments, DevOps environment 104 may be based on platforms such as Chef™, Puppet™, Ansible™, Splunk™, or others.

System 100 may also comprise one or more security servers 105 in communication with network 107. Security server 105 may perform authentication and/or authorization for various components of system 100. Further, security server 105 may perform the techniques described below in connection with FIGS. 2-5. In an example implementation, security server 105 may be in communication with a client device 101 and cloud computing environment 102 such that security server 105 may grant access to a cloud computing service in cloud computing environment 102 when requested by an identity associated with a user of client device 101. In some embodiments, security server 105 may authenticate and/or authorize the identity for such access. Security server 105 may also manage and store permissions for identities associated with client devices 101. For example, permissions and credentials may be stored using platforms such as CyberArk's Privileged Access Security™, Centrify's Privileged Access Servicer™, IBM's Security Privileged Identity Manager™, AWS's Identity and Access Management™, Azure's Active Directory Privileged Identity Management™, or various others. Security server 105 may also communicate with database 106. Database 106 may comprise a single database, multiple databases, cloud storage, or other data storage services. In some embodiments, database 106 may be storage local to or integrated with the security server 105. In other embodiments, database 106 may be separate or remote. Database 106 may store lists of permissions, lists or directories of identities, other information associated with identities, etc.

Figure 2:
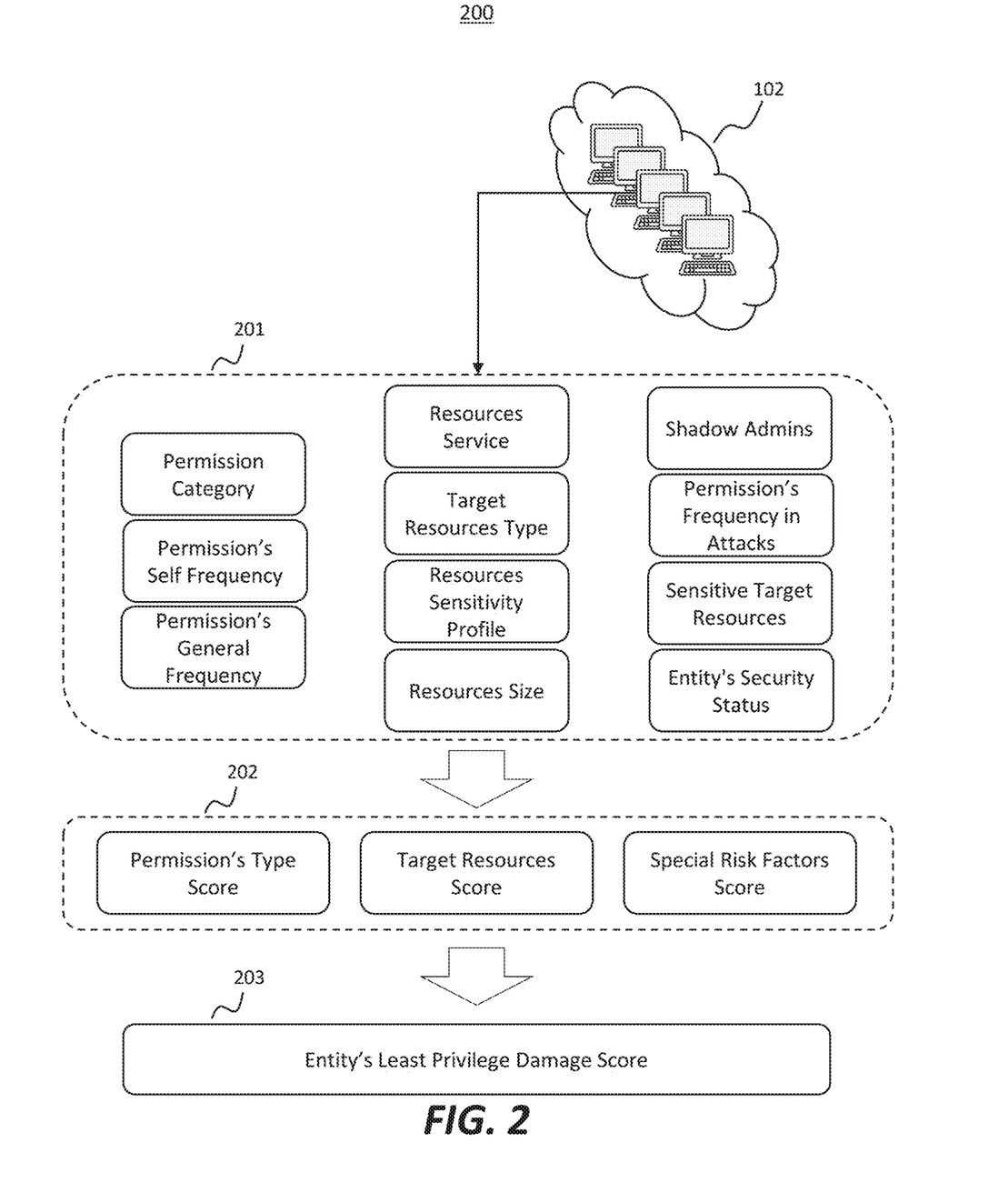
FIG. 2 is an illustration depicting the relationship between different types of least-privilege damage scores.

FIG. 2 is an illustration depicting the relationship between different levels of privilege damage scores, as discussed further below. A least-privilege damage score may be a normalized score that quantifies the extent of the security risk associated with specific permissions of an entity, for example a secure network resource, account, application, etc. The score may also correspond to the severity of the risk, the potential damage that could be caused by exploitation of the permission, the impact of a security breach using the permission, the urgency of making a change to address the potential risk of the permission, etc. As mentioned above, it may be desirable to limit the number of permissions that identities in an environment have to only the permissions that are actually needed for particular authorized functions, and no more (e.g., in scope or time). Reducing the number of unused permissions may reduce the number of potential avenues of attack for a malicious entity, without affecting legitimate operations in the environment. Thus, in some environments a least-privilege ratio can be calculated that compares the number of unused permissions to the number of total permissions. However, such a score does not take into account any potential differences between permissions. For example, an unused "delete" permission may present a greater risk to a system than an unused "read" permission because a malicious user could cause more harm by gaining access to the delete permission. A least-privilege damage score, as discussed below, may remedy this deficiency by addressing the amount of risk presented by a specific permission given the particular configuration of an environment.

As discussed above, cloud computing environment 102 may include, for example, a cloud computing service with a plurality of permissions associated with one or more virtualized identities. Group 201 of FIG. 2 illustrates the different least-privilege damage sub-scores that may be calculated for each permission. Sub-scores may be calculated based upon the permission's type, the affected resources, special risk factors, or other considerations. For example, an individual sub-score for each permission may be calculated for each one of the considerations shown in group 201. Thus, as illustrated in FIG. 2, for a given permission, a separate sub-score may be calculated based upon the permission's category, the permission's self-frequency, the permission's general frequency, the resource's service, the target resource's type, the resource's sensitivity profile, the resource's size, presence of or possibility of shadow administrators, the permission's frequency in attacks, unusually sensitive target resources, the security status of an entity associated with the permission, etc. While this list is not exhaustive, each of the exemplary sub-scores listed are discussed in greater detail below. In some embodiments, one or more of the sub-scores may be automatically assigned. For example, a machine learning algorithm may be used to learn the attributes, usage, etc. of different permissions for different entities, then assign sub-scores based upon that information. In some embodiments, one or more of the sub-scores may be manually configured.

Different types of permissions may be broken down into a plurality of predefined categories corresponding to different risk levels. For example, "list" and "describe" permissions (and other read-only permissions) may receive a category risk level of 1 (low), while "create user" and "delete user" permissions may receive a category risk level of 5 (high), thus creating a range of possible sub-scores based on the permission's category. A permission's self-frequency sub-score may be based upon a determination of how ordinary and frequent it is for the permission to be used by the particular identity it is associated with. For example, an entity using CreateGroup and CreateRole permissions in the past, would be reasonably expected have the CreateUser permission, thus the self-frequency potential damage score would be relatively low compared to an identity that has the CreateUser permission but has never used a "create" permission before. Similarly, a permission general frequency sub-score may be based upon a determination of how often the permission is used overall in the entire environment. For example, a more sensitive permission would often be used less frequently and used by fewer identities in the environment, and thus would receive a higher sub-score for being a more sensitive permission.

Separate sub-scores may also be calculated for the considerations related to the affected resources. The affected resource may be the target resource to which the permission grants access, ability to update, ability to alter, etc., for example, a cloud computing service, computing device, database, or similar resource. The resource's service sub-score may be based upon pre-assigned groupings of different services. Similarly, a service type sub-score may be calculated based upon the type of service offered. For example, search tools may present less risk and thus have lower service type sub-scores than storage services or authentication resources. A sub-score may also be calculated for the target resource's sensitivity profile. The sensitivity profile sub-score may be based upon a pre-defined score quantifying how sensitive the target resource is to attack. For example, a publicly available resource may be less sensitive than a resource containing secret data and/or requiring authentication for access. Accordingly, the publicly available resource may have a lower sensitivity profile sub-score. A sub-score may also be calculated based upon the size of the target resource(s). For example, if the permission affects a small number of resources or identities, it may have a lower target resource size sub-score than a permission affecting hundreds of resources or identities.

Separate scores may also be calculated for the considerations related to other special risk factors. Special risk factors may include the presence of or possibility of shadow admins, the permission's frequency in attacks, unusually sensitive target resources, or the security status of entity the permission. For example, a shadow admins sub-score may be high if the permission has the equivalent power of full administrative or root privileges. In some embodiments, the shadow admin sub-score may be a binary score, i.e., either 1 or 0, or either yes or no, indicating that the entity either is or is not a shadow admin. In some systems, a certain permission may have been used in past attacks. Thus, a sub-score may be calculated based upon the permission's frequency in previous attacks, giving a higher score to permissions that are likely to be used in an attack again. An unusually sensitive target may be, for example, a database containing extremely sensitive information. Thus, even a "read" permission on such a sensitive database may have an unusually high damage potential. The entity's security status sub-score may also relate to the type of security implemented by the entity associated with the permission. For example, if the entity with the unused permission is not secure, it may have a higher probability of being compromised, and thus may be assigned a higher damage sub-score. In some embodiments, this score may be calculated based upon an assessment of the parameters of a privileged access security system, including password age, credentials complex policy, automatic credential rotation, multi-factor authentication, credential protection in the endpoints or servers, the number of people with access to the entity's credentials, the number of employees with access to the entity's password, whether the credentials are being used directly in code, etc.

In some embodiments, one or more of the sub-scores may be combined to form aggregate scores 202. Aggregate scores may be created by normalizing and weighting sub-scores. For example, a permission's sub-scores corresponding to permission category, permission self-frequency, and permission general frequency may be combined to form a weighted aggregate Permission's Type Score. Similarly, a permission's resource's service, target resource type, resource sensitivity profile, and resource size may be combined to form an aggregate Target Resources Score. Likewise, in some embodiments, the permission sub-score corresponding to the presence of or possibility of shadow admins, the permission's frequency in attacks, unusually sensitive target resources, and the security status of entity the permission may be combined to form an aggregate Special Risk Factors Score.

To calculate the aggregate scores 202, each sub-score within group 201 may be assigned an absolute or relative weight. For example, the more critical scores may receive a weight of 50, while the less critical scores may receive a weight of 5. The sub-score 202 may then be calculated using the different separate scores, which may be weighted and normalized into a single score. An exemplary equation for calculating the weighted aggregate Permission Type score is shown below, where N1 corresponds to the maximum permission category sub-score, N2 is the maximum permission self-frequency sub-score, and N3 is the maximum permission general frequency sub-score. In some embodiments, other aggregate scores may be calculated in a similar manner. Weights may be assigned manually or automatically. In some embodiments, the weights may be dynamically adjusted, by, for example, a machine learning algorithm.

$$\frac{(\text{Permission Category score}) \times (\text{weight1}) + (\text{Self Frequency score}) \times (\text{weight2}) + (\text{General Frequency score}) \times (\text{weight3})}{N1 \times (\text{weight1}) + N2 \times (\text{weight2}) + N3 \times (\text{weight3})}$$

Calculating the score using the equation shown above may result in an aggregate least-privilege damage score with a value between 0 and 1. The closer a permission's score is to 1, the higher the potential damage the permission may cause. Likewise, the closer a score is to 0, the lesser the potential damage. Other variations on this equation, and the resulting score range, are possible as well.

In some embodiments, aggregate scores 202 that correspond to an entity may be combined to form the Entity's Least-Privilege Damage Score 203. The Entity's Least-Privilege Damage Score 203 is described in greater detail with respect to FIG. 3, below.

Figure 3:
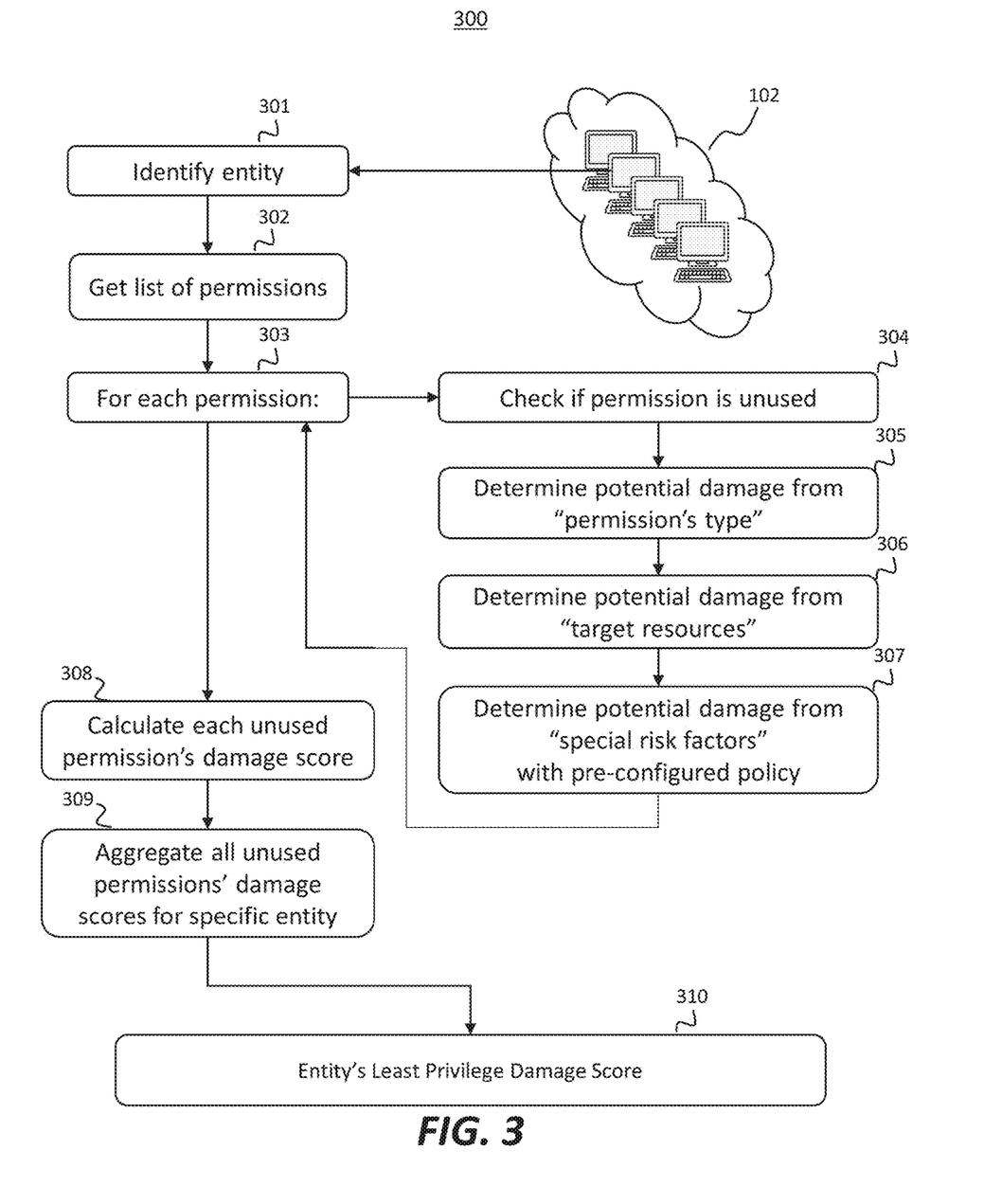
FIG. 3 is a flowchart depicting an exemplary process for calculating an entity's least-privilege damage score.

FIG. 3 is a flowchart depicting an exemplary process 300 for calculating an entity's least-privilege damage score. Process 300 may be carried out by, for example, security server 105 as discussed above in connection with FIG. 1. At step 301, process 300 may include identifying an entity (e.g., network identity) associated with cloud computing environment 102 that has one or more permissions. Consistent with the discussion above, this may include accessing a network directory service (e.g., Microsoft Active Directory™, AWS Managed Microsoft AD™, JumpCloud™ directory, etc.) or a cloud orchestration service (e.g., cloud orchestrator 103). At step 302, process 300 may retrieve a list of permissions associated with the entity. In some embodiments, the list of permissions may be retrieved from security server 105. In some embodiments, the security server 105 may retrieve the permissions list from database 106. For example, as discussed above, security server 105 and/or cloud orchestrator 103 may manage permissions using platforms such as CyberArk's Privileged Access Security™, Centrify's Privileged Access Service™, IBM's Security Privileged Identity Manager™, AWS's Identity and Access Management™, Azure's Active Directory Privileged Identity Management™, or various others.

At step 303, process 300 may iterate through a plurality of sub-steps, 304-307, for each permission identified in the list of permissions. In step 304, process 300 may determine if the permission is unused. The determination of whether a permission is unused may be based on an assessment of one or more parameters associated with the use of permission. The criteria for whether a permission is considered unused may be configurable by the system, for example, by security server 105. In some embodiments, process 300 may determine that a permission is unused if the permission has never been used before. In further embodiments, process 300 may determine that a permission is unused if the permission has not been used with a certain period of time defined by the system. As an example, if a permission has not been used in the previous 3 months, process 300 may consider the permission unused. In some embodiments, the determination of whether a permission is used may be indicated by a usage status of the permission. The usage status may be a binary value (i.e., either 1 or 0, or either yes or no) indicating that the permission is either used or unused. In other embodiments, the usage status may be a sliding scale that indicates how much the permission is used (e.g., a scale of 1 to 10, with 1 being never used and 10 being used very frequently). In such embodiments, the system may a set threshold value to decide if a permission is used or unused. For example, a system may set a threshold of 4, meaning that any permission having a usage status value of less than 4 is considered unused.

If process 300 determines that a permission is unused, it may advance to step 305. If process 300 determines that a permission is used, process 300 may move on to evaluate another permission within the list of permissions.

In step 305, process 300 may determine the potential damage from the permission's type. The potential damage may be quantified as a score, level, category, etc. As discussed above with respect to FIG. 2, a permission type score may be calculated based upon one or more sub-scores associated with the permission, including permission category, permission self-frequency, permission general frequency, or others.

In step 306, process 300 may determine the potential damage based on the target resources associated with the entity and/or the privilege. The potential damage may be quantified as a score. As discussed above with respect to FIG. 2, a target resource score may be calculated based upon one or more sub-scores associated with the permission, including the resource's service, target resources type, resource's sensitivity profile, and resource's size.

In step 307, process 300 may determine the potential damage based on special risk factors. The potential damage may be quantified as a score. As discussed above with respect to FIG. 2, a target resource score may be calculated based upon one or more sub-scores associated with the permission, including the potential for shadow admins, permission's frequency in attacks, sensitive target resources, and the entity's security status. The determination may be based upon pre-configured policies that define special risk factors or the scores associated with the special risk factors.

In step 308, process 300 may calculate a least-privilege damage score for each unused permission. In some embodiments, the least-privilege damage score may be calculated by weighting and combining the potential damage scores from the permission's type, target resources, and special risk factors, calculated in steps 305-307 above. The score may be calculated using, for example, the techniques discussed above. The score may be expressed as a numerical value (e.g., between 0 and 1, or 1 and 100), a percentage, a level, a category, etc.

In step 309, process 300 may aggregate all of the unused permissions' damage scores calculated in step 308. In step 310, process 300 may output the entity's least-privilege damage score, calculated from the aggregate of the of the unused permissions' damage scores for the entity. In some embodiments, the permission scores may be weighted when calculating the entity's least-privilege damage score. As discussed above with respect to FIG. 2, weights may be assigned manually or automatically by the system. In some embodiments, the weights may be dynamically assigned by, for example, a machine learning algorithm.

Figure 4:
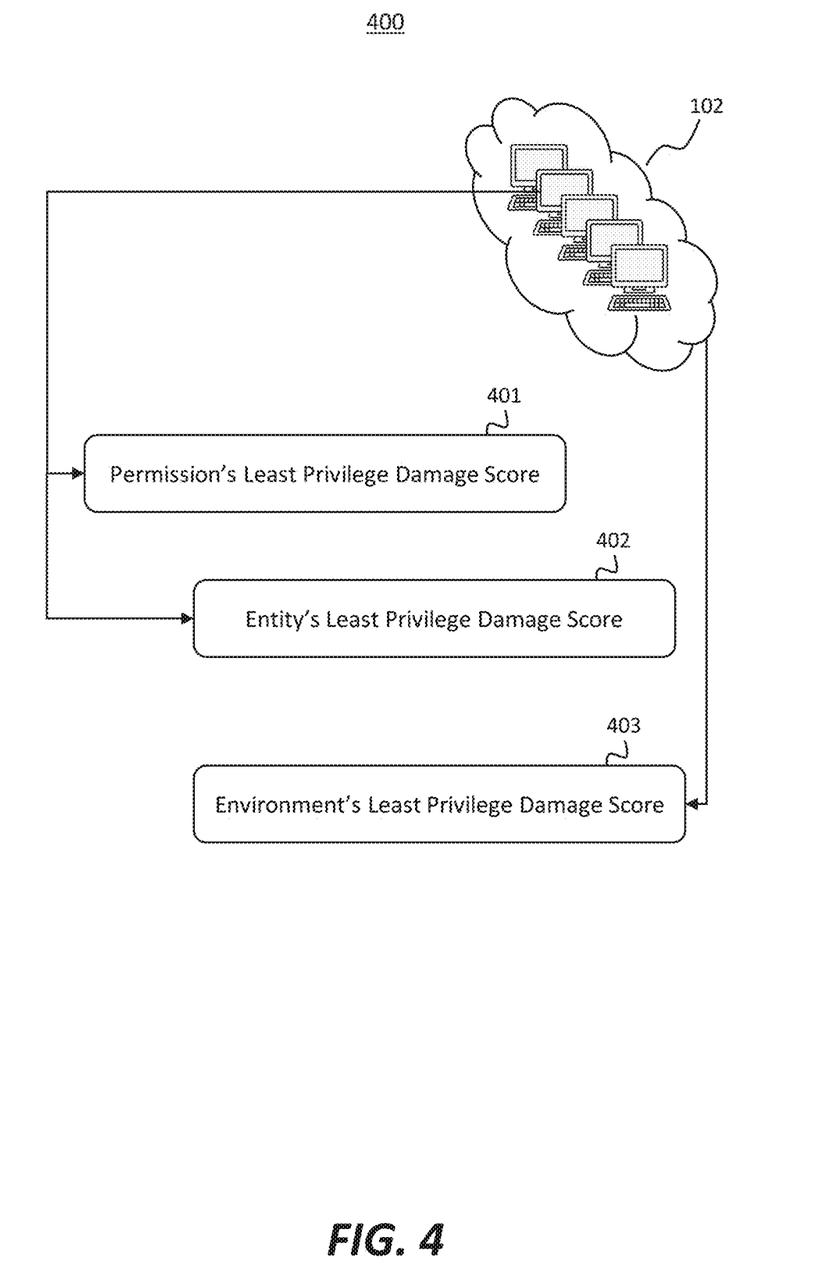
FIG. 4 is an illustration depicting multiple types of least-privilege damage scores.

FIG. 4 is an illustration of a system 400 depicting multiple types of least-privilege damage scores. A permission least-privilege damage score 401 may be calculated for each permission associated with an entity within cloud computing environment 102. As discussed above with respect to FIGS. 2 and 3, an entity's least-privilege damage score 402 may be calculated by aggregating the permission least-privilege damage scores 401 for each permission associated with the entity. Similarly, an environment's least-privilege damage score 403 may be calculated by aggregating the entity least-privilege damage scores 402 for each entity associated with the environment. Such aggregate scores may be calculated similarly to the equation discussed above with respect to FIG. 2. In some embodiments, the entity scores may be weighted such that the more sensitive or important entities are given more weight than less critical entities.

In some embodiments, least-privilege damage scores may be compared in order to prioritize which permissions/entities/environments should be addressed first or on a prioritized basis. For example, aggregate scores for several different entities may be compared. The entity with the highest score (most at risk), may be addressed first, consistent with FIG. 5, below. Then, the system may compare the scores corresponding to different permissions associated with the entity. The permission within the entity with the highest score may then be the first permission addressed by the system. Such prioritization permits the system to act most efficiently by addressing the most at-risk permissions/entities/environments first. In some embodiments, security server 105 may implement machine learning algorithms to more efficiently assign sub-scores, compare scores, and prioritize permissions/entities.

Figure 5:
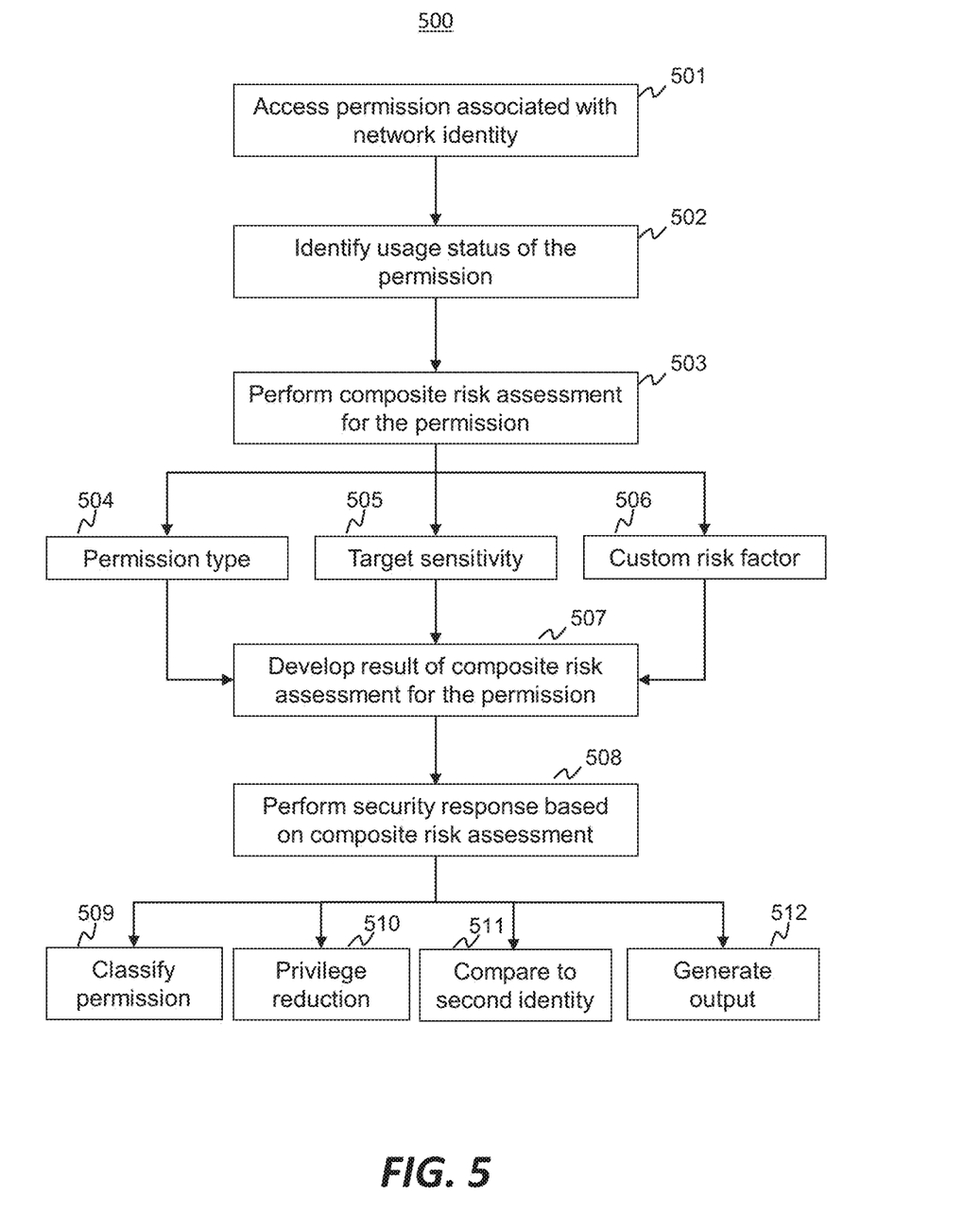
FIG. 5 is a flowchart depicting an exemplary process for performing a composite risk assessment and generating a security response.

FIG. 5 is a flowchart depicting an exemplary process 500 for performing a composite risk assessment and generating a security response. Process 500 may be executed by, for example, security server 105 as shown in FIG. 1. Process 500 may correspond to parts of FIGS. 2-4, and accordingly, descriptions of the components and processes therein may apply to process 500 as well. At step 501, process 500 may access a permission associated with a network identity. The network identity, for example, may be associated with client device 101.

At step 502, process 500 may include identifying a usage status of the accessed permission. The usage status, as described above with respect to FIG. 3, may be determined based upon, for example, whether the permission has ever been used, the number of times it has been used, whether the permission has been used within a specific time period, etc. In some embodiments, the usage status may be calculated based upon multiple factors. In some embodiments, the usage status may be a number that may be compared to a threshold value. In some embodiments, the usage status threshold value may be determined by the security server 105. If the usage status is below the threshold value, process 500 may continue to step 503. In some embodiments, if the usage status exceeds the threshold value, process 500 may not continue to step 503 and may not perform the composite risk assessment.

At step 503, process 500 may commence performing a composite risk assessment for the permission. The composite risk assessment may include identifying attributes of the permission (steps 504-506). Several examples of attributes of permissions were discussed above with respect to FIG. 2. Process 500 may further execute one or more of steps 504-506. At step 504, process 500 may identify a permission type. The permission type may include the function of the permission, for example, read, write, delete, create, list, describe, get, enable, tag, untag, deactivate, add, update, attach, etc. Permission type may also identify the frequency of use of the permission by a specific identity (self-frequency) or the frequency of usage of the permission by multiple identities (general frequency).

At step 505, process 500 may identify a target sensitivity. In some embodiments, the target sensitivity may be based upon a predefined classification of sensitivity. Predefined classifications of sensitivity may include publicly available resources, restricted resources, or restricted resources with secret data. Classifications may be defined such that most sensitive resources are given a higher classification score. The target sensitivity may also include a sensitivity score determined for the target resource. In further embodiments, the target sensitivity may be based on the size of the target resource. As discussed above with respect to FIG. 2, a smaller target resource may be less sensitive to attack.

At step 506, process 500 may identify one or more custom risk factors. In some embodiments, a custom risk factor may address whether the permission corresponds to a designated sensitive administrator privilege. As discussed above with respect to FIG. 2, a sensitive administrator privilege may be, for example, one that gives the identity full administrative or root power over the entity or the ability to create additional users. In some embodiments, the customized risk factor may address whether the permission corresponds to a designated sensitive target network resource. For example, a designated sensitive target network resource may be a database containing highly sensitive or secret information or an authentication resource that controls access to multiple entities. Such designated sensitive target resources may warrant greater security and may thus receive higher risk scores. In yet further embodiments, the customized risk factor may address whether the permission corresponds to a historical attack permission. A historical attack permission may be, for example, a permission that has been used in one or more previous malicious attacks waged on the corresponding entity or on other entities or environments. The custom risk factor may also correspond to a security status of the entity. In some embodiments, entities with greater security measures already in place may receive a lower score, indicating they are less susceptible to attack. For example, an entity with systems in place such as multi-factor authentication or CyberArk's Privileged Access Security™ Solutions may receive a lower score than entities without such security measures in place.

At step 507, process 500 may develop a result of the composite risk assessment for the permission. The result may be based upon the one or more permission attributes identified in steps 504-506. For each permission attribute identified in any one of steps 504-506, process 500 may create a corresponding potential damage score, as discussed above with respect to FIGS. 2-4. In some embodiments, the result may be a combination of the permission type, target sensitivity, or custom risk factor scores. Such a score may be calculated by assigning different weights to the permission type, target sensitivity, or custom risk factor scores and combining them into a single weighted score.

At step 508, process 500 may perform a security response based on the composite risk assessment. In some embodiments, based upon the score generated at step 507, process 500 may proceed to one or more of steps 509-512. In some embodiments, two or more of steps 509-512 may be performed simultaneously. In other embodiments, the steps may be performed sequentially. In yet further embodiments, process 500 may perform just one of steps 509-512.

At step 509, process 500 may classify the relevant permission. For example, based on the calculated score, the permission may be classified as a high-risk permission that likely needs to be removed. In other cases, the permission's score may be relatively low, which may cause it to be classified as, for example, a low-risk permission, which may not need to be altered.

At step 510, process 500 may reduce privileges associated with the permission. In some embodiments, if the score is relatively high, privileges for the corresponding identity might be reduced.

At step 511, process 500 may compare the score associated with the permission to a score of a permission associated with another identity. In some embodiments, the score associated with the permission may be compared to a score associated with another permission of the same identity. Such a score comparison may be possible because the scores for each permission are normalized. In some embodiments, process 500 may prioritize security responses based upon the comparison. For example, two scores corresponding to permissions from two different identities may be compared. The permission with the higher score, thus presenting a higher damage risk, may be prioritized such that it would be addressed first.

At step 512, process 500 may generate an output, such as a security report, alert, or least-privilege damage score report. In some embodiments, the output may be transmitted to security server 105. Security server 105 may evaluate the output and determine whether to take action and, if action is warranted, what action to take. For example, security server 105 may receive a least-privilege damage score report indicating that one entity has several unused high-risk permissions capable of causing great damage. The security server 105 may then cause those permissions to be revoked. In some embodiments, evaluations of the output and corresponding actions may happen automatically without sending the output to security server 105.

It is to be understood that process 500 may be performed for single permissions or multiple permissions. In some embodiments, process 500 may be performed for multiple permissions simultaneously. In further embodiments, process 500 may access multiple permissions at step 501 and may execute the process 500 for the multiple permissions, creating aggregate scores as described with respect to FIGS.

2-4. For example, process 500 may be conducted for all permissions present within a certain entity, or an entire network environment.

A potential use case of the disclosed embodiments is described below. It is understood that this exemplary use case is provided by way of example only and is not limiting of the present disclosure.

One potential implementation may be to address the least-privilege security problem of a database containing highly sensitive information. A user may use a computing device (e.g., a laptop computer) to access the database hosted in a cloud computing network. The computing device, database, and cloud computing network may also be in communication with a security server that manages secure access to the database. Using the laptop computer, the user may request access to the database. In response, the security server may request that the user be authenticated using some type of identifier, such as a user account and password or biometric authentication. If user's credentials are valid, the security server may authorize access to the user. The user's account may have a number of different permissions associated with it. For example, the user may be able to read the information contained on the database. Users with administrative accounts may have more permissions, such as the ability to delete information from the database, or create new authorized users.

In order to increase security and limit its potential attack surface, the system may run a least-privilege damage check on the system, calculate one or more least-privilege damage scores, and act accordingly based upon the resulting scores. This may occur automatically before the identity is permitted to access the database, periodically, or otherwise. The system may identify all of the relevant permissions associated with the identity. The system may then choose a specific permission and identify if it is used by the corresponding user's identity. If unused, the system may then identify a number of attributes for that permission, for example, the type of permission, the permission's self-frequency, and the permission's general frequency. The system may then calculate a least-privilege damage score based upon the permission's type attributes. For example, if the unused permission selected is a "delete" permission, the identity has never used a delete or similar permission, and delete permissions are rarely used by any other identities associated with the database, the permission type score may be relatively high, indicating that the permission is high risk.

The system may also identify attributes of the database (the target resource) and calculate a score based on those attributes. For example, the system may identify that the resource is for data storage, is specifically a database, and contains sensitive information. The system may also identify that the resource is relatively small because the identity credentials relate to only a single database. Accordingly, the system may create a weighted score related to the target resource.

The system may further create a third least-privilege damage score relating to other special risk factors, such as the risk of shadow admins, the specific permission's frequency in attacks, whether the target resource is identified as especially sensitive, and the security status of the resource. This score may be particularly high for the database in this example because it could be identified as an especially sensitive resource because it contains sensitive or secret information.

The system may then calculate the permission's overall least-privilege damage score by combing the permission's type score, the target resources score, and the special risk factors score. The system may repeat this process for each of the unused permissions associated with the identity. Then the system may compare the scores of each permission and identify the most at risk unused permission. The system may then address the problem by revoking the highest risk permission first. In this example, an unused delete permission associated with the user's identity may be revoked if the user has never used it because the delete permission may present a high risk to the system if access is obtained by a malicious user that wishes to destroy important data stored on the database.

In scenarios where there are multiple secure resources, such as multiple identities, the system may create an aggregate entity least-privilege damage score for each identity. The entity least-privilege damage score may be calculated by aggregating the scores of the permissions associated with the particular entity (e.g., each identity). Comparing the entity least-privilege damage scores for each identity may permit the system to determine which identity is the highest risk, and thus should be addressed first. After determining the highest risk identity, the system may then compare the scores for the permissions associated with the identity to determine which permissions of the identity should be addressed first.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for developing composite and permission-based risk assessments for network identities, the operations comprising:
accessing a permission associated with a network identity;
for the permission, identifying a usage status of the permission;
performing a composite risk assessment for the permission, the composite risk assessment including at least two of:
identifying a permission type associated with the permission,
identifying a sensitivity of a target resource associated with the permission, or
identifying a customized risk factor associated with the permission, the customized risk factor being developed for a network environment;
developing a result of the composite risk assessment for the permission; and
performing a security response based on the result of the composite risk assessment, the security response including:
normalizing the result of the composite risk assessment to quantify the extent of risk associated with the permission; and
comparing the result of the composite risk assessment of the permission associated with the network identity with a result of a second composite risk assessment performed for a permission associated with a second network identity.

2. The non-transitory computer readable medium of claim 1, wherein the operations further comprise performing the composite risk assessment for each permission within a set for which the permission is determined to have a usage status below a threshold of use.

3. The non-transitory computer readable medium of claim 2, wherein the result of the composite risk assessment is a composite result based on the composite risk assessment for each permission within the set for which the permission is determined to have a usage status below the threshold of use.

4. The non-transitory computer readable medium of claim 1, wherein the operations further comprise:
performing the composite risk assessment for a plurality of network identities in the network environment; and
developing an environment-wide result of the composite risk assessment for the plurality of network identities in the network environment.

5. The non-transitory computer readable medium of claim 1, wherein determining the usage status of the permission includes determining whether the permission has been used within a threshold amount of time.

6. The non-transitory computer readable medium of claim 1, wherein the operations further comprise:
identifying a permission within the set for which the determined usage status is above a threshold of use; and
determining, based on the determined usage status being above the threshold of use, not to perform the composite risk assessment for the permission.

7. The non-transitory computer readable medium of claim 1, wherein the customized risk factor associated with the permission addresses whether the permission corresponds to a designated sensitive administrator privilege.

8. The non-transitory computer readable medium of claim 1, wherein the customized risk factor associated with the permission addresses whether the permission corresponds to a designated sensitive target network resource.

9. The non-transitory computer readable medium of claim 1, wherein the customized risk factor associated with the permission addresses whether the permission corresponds to a historical attack permission.

10. The non-transitory computer readable medium of claim 1, wherein the customized risk factor associated with the permission addresses a security status of the network identity.

11. The non-transitory computer readable medium of claim 1, wherein the comparison of the normalized result associated with the network identity with the normalized result associated with a second network identity is used to prioritize which permission would be addressed first.

12. A computer-implemented method for developing composite and permission-based risk assessments for network identities, the method comprising:
accessing a permission associated with a network identity;
for the permission, identifying a usage status of the permission;
performing a composite risk assessment for the permission, the composite risk assessment including at least two of:
identifying a permission type associated with the permission,
identifying a sensitivity of a target resource associated with the permission, or
identifying a customized risk factor associated with the permission, the customized risk factor being developed for a network environment;
developing a result of the composite risk assessment for the permission; and
performing a security response based on the result of the composite risk assessment, the security response including:
normalizing the result of the composite risk assessment to quantify the extent of risk associated with the permission; and
comparing the result of the composite risk assessment of the permission associated with the network identity with a result of a second composite risk assessment performed for a permission associated with a second network identity.

13. The computer-implemented method of claim 12, wherein each of the factors in the composite risk assessment is assigned one or more weights.

14. The computer-implemented method of claim 12, wherein developing the result of the composite risk assessment for the permission includes generating a risk-based least-privilege score for the permission.

15. The computer-implemented method of claim 14, further comprising applying one or more weights to the risk-based least-privilege score for the permission.

16. The computer-implemented method of claim 12, wherein the permission type of the permission includes at least one of: a read permission, a write permission, a delete permission, or a create permission.

17. The computer-implemented method of claim 12, wherein the permission type of the permission is based on a frequency of usage of the permission by the network identity.

18. The computer-implemented method of claim 12, wherein the permission type of the permission is based on a frequency of usage of the permission by a plurality of network identities in the network environment.

19. The computer-implemented method of claim 12, wherein the sensitivity of the target resource associated with the permission is based on a predefined classification of sensitivity.

20. The computer-implemented method of claim 12, wherein the sensitivity of the target resource associated with the permission is based on a sensitivity score determined for the target resource.

21. The computer-implemented method of claim 12, wherein the sensitivity of the target resource associated with the permission is based on a size of the target resource.

22. The computer-implemented method of claim 12, wherein developing the result of the composite risk assessment for the permission includes combining a plurality of factors associated with permission into a single weighted score, wherein the plurality of factors includes the permission type, the sensitivity of the target resource associated with the permission, and the customized risk factor.

* * * * *